Patented May 14, 1929.

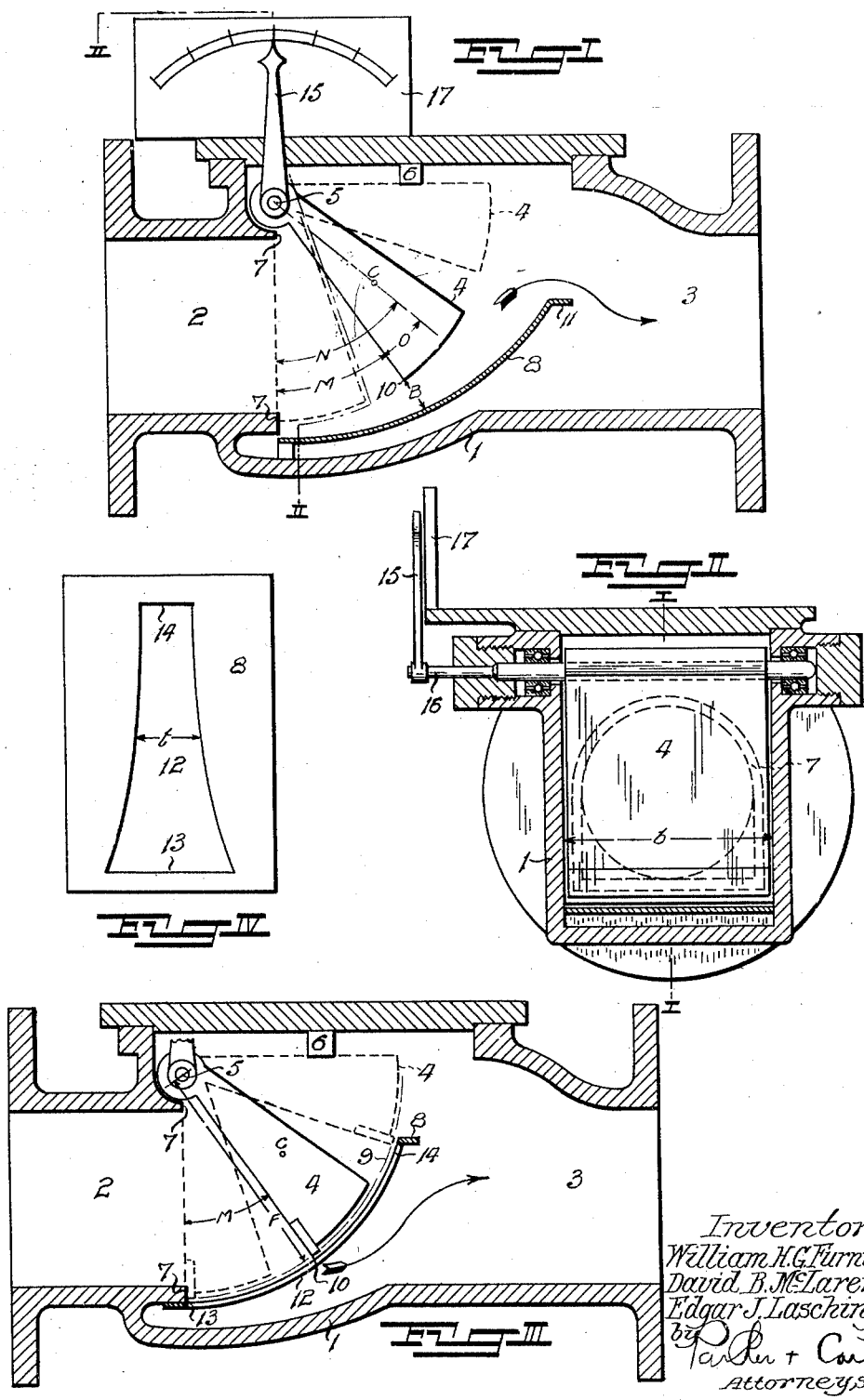

1,712,761

UNITED STATES PATENT OFFICE.

WILLIAM HENRY GRAHAM FURNIVALL, DAVID BERTHA McLAREN, AND EDGAR JACOB LASCHINGER, OF JOHANNESBURG, SOUTH AFRICA.

FLUID METER.

Application filed July 7, 1925, Serial No. 42,006, and in Great Britain November 10, 1924.

The present invention relates to fluid meters of the kind in which the flowing fluid displaces a pivoted gate tending to close against the flow; and in which a shield curved in the direction of the path of the free edge of the gate provides in itself, or forms with said free edge of the gate, a gate controlled orifice for the fluid which varies in area according to the displacement of the gate from its zero position.

The purpose of the invention is to provide a meter of this kind having a gravity gate and an orifice such that the displacement of the gate is directly proportional to the rate of flow of the fluid.

The invention is illustrated in the accompanying drawings in which,

Fig. I shows a meter sectioned on I—I Fig. II, the gate being partly open.

Fig. II is a section of the same on II—II Fig. I, with the gate shut.

Fig. III is a similar view to Fig. I but showing a modification.

Fig. IV is a developed view of the slotted shield of Fig. III.

In the drawings 1 indicates the meter casing providing a substantially straight fluid passage indicated by 2, 3. The gate 4 is pivoted to swing about the axis 5, and at no flow hangs across the line of flow of the fluid. A stop 6 limits its upward movement when raised by the flow of fluid. It is preferred to provide a seat 7 against which the gate closes at no flow and so to arrange the centre of gravity C, of the gate that at no flow a component of its weight remains effective to hold it against the seat and provide an initial resistance to its movement. 8 is the shield which is arranged adjacent to the path of movement 9 of the free edge 10 of the gate.

In the construction shown in Figs. I and II the shield curves away from the path 9, and the variable orifice for the fluid is the area $B^b$ between the free edge 10 of the gate and the shield, which area becomes progressively greater as the gate swings upwards, and so passes increasing quantities of fluid per unit of time. The fluid flows away over the free end 11 of the shield.

In the modification shown in Fig. III the shield conforms closely to the path 9. The orifice is formed by the slot 12 in the shield, which slot is progressively uncovered by the gate as it swings upwards; the fluid flowing through the part of the orifice thus uncovered. Fig. IV shows that the width $t$ of the slot decreases from its lower end 13 towards its upper end 14.

In both constructions the area, or utilized area, of the orifice corresponding to any angular position of the gate is such that the flow of fluid is directly proportional to the displacement of the gate from its closed position. A measuring pointer 15 or the like may accordingly be mounted directly on the spindle 16 of the gate and co-operate with a dial 17, a chart or the like, having equally spaced divisions.

Applicants have computed the following general formula for calculating the area of the orifice at any position of the gate, which is necessary to cause the displacement, from zero, of the gate in that position, to be directly proportional to the flow of fluid in that position, viz:—

$A$ (orifice area in square inches) =

$$\frac{JM}{cK\sqrt{\sin N}} \quad (1)$$

In this expression M is the value, in degrees, of the actual angular displacement of the gate from its closed position. N is the value, in degrees, of the angular displacement of the centre of gravity of the gate from the vertical line through the axis of the gate. N thus equals $M+O$, where O is the angle of lead, or in other words the angle through which the centre of gravity of the gate is displaced from the vertical line through the axis of the gate, when the gate is closed. It will be evident from the formula that the essential relationship between the area of the orifice and the angular displacement of the gate is that the area varies directly as angle M and inversely as the square root of sine N.

The factor $c$ represents the co-efficient of discharge for the orifice, and may usually be regarded as a constant. Actually its value varies slightly with the area of the orifice; and when particular accuracy is necessary, it is determined experimentally.

The value of the factor J for the Fig. I construction is found by dividing the maximum desired flow of fluid (measured, in the case of compressed air, in pounds per minute) by the maximum desired displacement of the gate in degrees. The figure thus obtained multiplied by $\frac{180}{\pi}$ gives the value of J for the Fig. III construction.

K is a constant represented by the expression $$K = \sqrt{\frac{2gWLY}{144AD}},$$

in which
$g$ = acceleration due to gravity in feet per second per second.
$W$ = weight of gate in pounds.
$L$ = distance in inches from centre of gate axis to the centre of gravity C of the gate.
$Y$ = the specific weight in pounds per cubic foot, of the incoming fluid.
$A$ = the area of the gate in square inches.
$D$ = distance in inches from the centre of the gate axis to the centre of area of the gate.

The computation of the general formula (1) is given below; the symbols already explained being used, together with the following:
$p_1$ = fluid pressure at the incoming side of the gate (i. e. at 2) in lbs. per square inch.
$h = p_1$ less the fluid pressure at the outgoing side of the gate (i. e. at 3) in lbs. per square inch.
$Q$ = fluid flowing in lbs. per second.
$R$ = gas constant.
$T$ = absolute temperature.

The known formula for flow through an orifice is $$Q = Ac\sqrt{2gh}\sqrt{\frac{P_1}{RT}} \quad (9)$$

but $\frac{P_1 144}{RT}$ = specific weight of the incoming fluid in lbs. per cubic foot to which the symbol $Y$ is assigned above, so that the equation becomes $$Q = Ac\sqrt{\frac{2gY}{144}}\sqrt{h} \quad (10)$$

From the known theory of the balance of couples there is derived $$hAD = WL \times \sin N \quad (11)$$

from which $$\sqrt{h} = \sqrt{\frac{WL}{AD}}\sqrt{\sin N} \quad (12)$$

Substituting this value of $\sqrt{h}$ in equation (10) gives $$Q = Ac\sqrt{\frac{2gY}{144}} \times \sqrt{\frac{WL}{AD}} \times \sqrt{\sin N} \quad (13)$$

Indicating $$\sqrt{\frac{2gWLY}{144AD}}$$

by the symbol $K$, as explained above, brings the equation to the form $$Q = Ac\, K\sqrt{\sin N} \quad (14)$$

But as it is a condition that the angle of movement $M$ of the gate shall be proportional to the rate of flow $Q$.

$$Q = JM \quad (15)$$

Equating the two values of $Q$ from 14 and 15 then gives the general formula viz:—

$$A = \text{area in square inches} = \frac{JM}{cK\sqrt{\sin N}}.$$

The general equation (1) given above is applicable to either the Fig. I or the Fig. IV construction. From it the orifice areas corresponding to a number of different values of the angle of displacement, M, can be determined and thus the form of the whole orifice can be arrived at.

In practice it is more convenient to use modifications of this formula suitable for the specific form of the invention which is to be constructed. Thus in the Fig. I form of the invention, the orifice is always a rectangle and its area is $Bb$, where $b$ is the breadth and B is the width, both in inches. The expression $Bb$ may accordingly be equated to the general expression for area thus—

$$Bb = \frac{JM}{cK\sqrt{\sin N}} \quad (2)$$

On dividing both sides by $b$, the equation becomes $$B = \frac{JM}{bcK\sqrt{\sin N}} \quad (3)$$

As the breadth of the orifice remains constant in this case, Equation (3) gives the values of the varying width B, corresponding to different values of M. By calculating a number of values of B the proper curvature of the shield $g$ in Fig. I is arrived at. In the case of the Fig. III construction, the variable to be calculated is the width $t$ of the slot for the different values of M. An equation (8 below) for this purpose is obtained as follows, using a new factor F which represents the distance, in inches, from the axis of the gate to the free edge 8 of the same.

The general equation $$A = \frac{JM}{cK\sqrt{\sin N}} \quad (1)$$

is used, but for convenience of calculation the angles M and N are expressed in terms of arc to radius unity.

Differentiating:—

$$dA = \frac{J}{cK} d\left(\frac{M}{\sqrt{\sin N}}\right) \quad (4)$$

Since $$d\frac{M}{\sqrt{\sin N}} = \frac{\sqrt{\sin N}\, dM - M d\sqrt{\sin N}}{\sin N}$$

and $$d\sqrt{\sin N} = \frac{d(\sin N)}{2\sqrt{\sin N}}$$

formula (4) becomes $$dA = \frac{J}{2cK\sqrt{\sin N}}(2dM - M \cot N\, dN) \quad (5)$$

Since $N = (M+O)$ and $O$ is constant $$dN = dM \quad (6)$$

In terms of its width $t$ and the factor F, the area of the slot in Fig. IV is given by $$A = \int t F\, dM$$

so that $$dA = t F\, dM \quad (7)$$

Combing Equations 5, 6 and 7 and converting, so as to express M in degrees, gives:—

$$t(\text{in inches}) = \frac{J}{2cFK\sqrt{\sin N}}\left(2 - \frac{\pi M}{180} \cot N\right) \quad (8)$$

By calculating the width $t$ for a number of different angles M, the form of the slot $t$ is obtained.

We claim:—

1. A fluid meter comprising a casing, a gate pivoted within the casing to be swung up about an axis and against gravity by the flow of fluid through the meter, a shield curved in the general direction of the path of the free edge of the gate, said free edge of the gate and the shield being shaped to define an orifice for the flow of fluid, the area of which orifice varies with the displacement of the gate and is a function both of the angular displacement of the gate and the angular displacement of the center of gravity of the gate, from a vertical position below the gate pivot axis, and flow measuring means comprising a member connected to the gate to move therewith and adapted to be used as an index of the extent of its movement.

2. A fluid meter comprising a casing providing a passage for the flow of fluid, a pivoted gate adapted to hang at no flow across said passage and to be swung upwards against gravity by the flow, and a shield curved in the direction of the path of the free edge of the gate, said free edge of the gate and the shield being shaped to define an orifice for the flow of fluid, the area of which orifice corresponding to any angular position of the gate varies directly as the angle of displacement of the gate from its no flow position and inversely as the square root of the sine of the angle of displacement of the centre of gravity of the gate from a vertical line through the axis of the gate.

3. A fluid meter comprising a casing, providing a passage for the flow of fluid, a pivoted gate adapted to hang at no flow across the passage and to be swung upwards against gravity by the flow, and a shield curved in the general direction of the path of the free edge of the gate; but diverging therefrom towards its upper part in such a manner that the space between said edge of the gate and the shield forms an orifice of which the area corresponding to any angular position of the gate varies directly as the angle of displacement of the gate from its no flow position and inversely as the square root of the sine of the angle of displacement of the centre of gravity of the gate from a vertical line through the axis of the gate.

4. A fluid meter comprising a casing providing a passage for the flow of fluid, a pivoted gate adapted to hang at no flow across the passage and to be swung upwards against gravity by the flow, and a shield curved in the general direction of the path of the free edge of the gate but diverging therefrom towards its upper part in such a manner that the space between said edge of the gate and the shield forms a rectangular orifice of which the breadth varies directly as the angle of displacement of the gate from its no flow position and inversely as the square root of the sine of the angle of displacement of the centre of gravity of the gate from a vertical line through the axis of the gate.

5. A fluid meter comprising a casing, a gate pivoted within the casing to be swung up about an axis and against gravity by the flow of fluid through the meter, a shield curved in the general direction of the path of the free edge of the gate, said free edge of the gate and the shield being shaped to define an orifice for the flow of fluid, the area of which orifice varies with the displacement of the gate and is a function both of the angular displacement of the gate and the angular displacement of the center of gravity of the gate, from a vertical position below the gate pivot axis, and flow measuring means comprising a member connected to the gate to move therewith in combination with a measuring scale, the said member adapted to indicate on said scale the extent of movement of said gate.

Signed at Johannesburg, Transvaal Province, Union of South Africa, this 3rd day of June, 1925.

WILLIAM HENRY GRAHAM FURNIVALL.
DAVID BERTHA McLAREN.
EDGAR JACOB LASCHINGER.